(12) United States Patent
Chua et al.

(10) Patent No.: US 8,763,088 B2
(45) Date of Patent: Jun. 24, 2014

(54) DISTRIBUTED AUTHENTICATION, AUTHORIZATION AND ACCOUNTING

(75) Inventors: Roy Liang Chua, Cupertino, CA (US); Sean Joseph Convery, Mountain View, CA (US); Andrew Keith Pearce, San Francisco, CA (US); Ashish Thusoo, Fremont, CA (US)

(73) Assignee: Rockstar Consortium US LP, Plano, TX (US)

( * ) Notice: Subject to any disclaimer, the term of this patent is extended or adjusted under 35 U.S.C. 154(b) by 1054 days.

(21) Appl. No.: 12/518,636

(22) PCT Filed: Dec. 12, 2007
(Under 37 CFR 1.47)

(86) PCT No.: PCT/US2007/087259
§ 371 (c)(1),
(2), (4) Date: Nov. 18, 2009

(87) PCT Pub. No.: WO2008/076760
PCT Pub. Date: Jun. 26, 2008

(65) Prior Publication Data
US 2011/0055900 A1  Mar. 3, 2011

Related U.S. Application Data

(60) Provisional application No. 60/869,881, filed on Dec. 13, 2006.

(51) Int. Cl.
*H04L 9/32* (2006.01)
*H04L 29/06* (2006.01)

(52) U.S. Cl.
CPC .......... *H04L 63/104* (2013.01); *H04L 63/0892* (2013.01); *H04L 63/0823* (2013.01); *H04L 63/083* (2013.01)
USPC ......... 726/4; 726/1; 726/18; 726/27; 713/155

(58) Field of Classification Search
None
See application file for complete search history.

(56) References Cited

U.S. PATENT DOCUMENTS 5,276,901 A * 1/1994 Howell et al. .................. 340/5.2
5,483,596 A * 1/1996 Rosenow et al. .............. 713/167

(Continued)

FOREIGN PATENT DOCUMENTS

EP    1104133 A1    5/2001
WO    0111451 A1    2/2001

(Continued)

OTHER PUBLICATIONS

InTechnology Steel-Belted RADIUS Enterprise Edition product description, copyright 2006, downloaded on Aug. 14, 2006 from http://www.funk.com.au/funk/clisplay.asp?old=76.

(Continued)

*Primary Examiner* — Jung Kim
*Assistant Examiner* — James J Wilcox
(74) *Attorney, Agent, or Firm* — Withrow & Terranova, PLLC (57) ABSTRACT

In some embodiments, computer systems, storage mediums, and methods are provided for controlling a connecting device's access to a plurality of computer networks. In other embodiments, the provided computer systems, storage mediums, and methods may provide for authentication, authorization, and accounting of connecting devices connecting to a plurality of computer networks. In other embodiments, the provided computer systems, storage mediums, and methods may provide for the distribution of authentication routing data and authorization policies among a plurality of computer networks. In yet other embodiments, the provided computer systems, storage mediums, and methods may provide for the distribution of accounting among a plurality of computer networks.

20 Claims, 8 Drawing Sheets

(56) References Cited

U.S. PATENT DOCUMENTS

| | | | |
|---|---|---|---|
| 5,666,415 A * | 9/1997 | Kaufman | 713/159 |
| 5,678,041 A * | 10/1997 | Baker et al. | 1/1 |
| 5,721,779 A | 2/1998 | Funk | |
| 5,991,807 A * | 11/1999 | Schmidt et al. | 709/225 |
| 5,999,978 A * | 12/1999 | Angal et al. | 709/229 |
| 7,124,197 B2 | 10/2006 | Ocepek et al. | |
| 7,356,703 B2 * | 4/2008 | Chebolu et al. | 713/182 |
| 7,698,384 B2 * | 4/2010 | Drouet et al. | 709/219 |
| 7,818,580 B2 * | 10/2010 | Bardsley et al. | 713/182 |
| 7,882,538 B1 * | 2/2011 | Palmer | 726/1 |
| 8,024,471 B2 * | 9/2011 | Sinclair et al. | 709/229 |
| 8,141,138 B2 * | 3/2012 | Bhatia et al. | 726/8 |
| 2003/0163737 A1 * | 8/2003 | Roskind | 713/201 |
| 2003/0237004 A1 | 12/2003 | Okamura | |
| 2004/0168090 A1 * | 8/2004 | Chawla et al. | 713/201 |
| 2004/0210672 A1 | 10/2004 | Pulleyen et al. | |
| 2005/0010758 A1 | 1/2005 | Landrock et al. | |
| 2005/0120213 A1 | 6/2005 | Winget et al. | |
| 2005/0125663 A1 | 6/2005 | Funk | |
| 2005/0125692 A1 | 6/2005 | Cox et al. | |
| 2006/0041578 A1 | 2/2006 | Bailey et al. | |
| 2006/0101520 A1 | 5/2006 | Schumaker et al. | |
| 2006/0136575 A1 | 6/2006 | Payne et al. | |
| 2006/0161653 A1 | 7/2006 | Webb et al. | |
| 2006/0164199 A1 | 7/2006 | Gilde et al. | |
| 2006/0168648 A1 | 7/2006 | Vank et al. | |

FOREIGN PATENT DOCUMENTS

| | | |
|---|---|---|
| WO | 2004051964 A2 | 6/2004 |
| WO | 2005103940 A2 | 11/2005 |
| WO | 2005106701 A2 | 11/2005 |
| WO | 2006001587 A1 | 1/2006 |
| WO | 2006045847 A1 | 5/2006 |
| WO | 2006062646 A2 | 6/2006 |
| WO | 2006078729 A2 | 7/2006 |

OTHER PUBLICATIONS

Lockdown Networks NAC Product Overview, copyright 2006, downloaded on Aug. 14, 2006 from http://www.lockdownnetworks.com/products/solutions.php.
A10 Networks IDentity Aware Network Solutions IDSentrie 1000 product overview, copyright 2005-2006, downloaded on Aug. 14, 2006 from http://www.a10networks.com/ products/index.htnnl.
Infoblox ID Aware DHCP Solution NAC Overview, downloaded on Aug. 14, 2006 from http://infoblox.com/solutionsfauth-dhcp.cfm.
International Search Report for PCT Application Publication No. WO 2007/016436 A3, mailed on Jul. 12, 2007.
International Search Report for PCT Application Publication No. WO 2008/076760, mailed on Jun. 5, 2008.
Notification Concerning Transmittal of International Preliminary Report on Patentability for PCT Application Publication No. WO 2007/016436 A3, mailed on Feb. 7, 2008.
Extended European Search Report for 07869161.5 mailed Oct. 29, 2012, 5 pages.

* cited by examiner

| REALM POLICY | |
|---|---|
| REALM POLICIES | REALM POLICY DETAILS — 80 |

NAME: DEFAULT REALM POLICY

REALMS: REALM NAME — 82
EVILCORP.COM

☐ NULL REALM
☐ ANY REALM

[+] [−]

| NAME |
|---|
| DEFAULT REALM POLICY |
| REALM POLICY 1 |

— 86

| | DIRECTORY TYPE | FALLTHROUGH IF UNABLE TO CONNECT | FALLTHROUGH IF USER NOT FOUND | FALLTHROUGH IF AUTHENTICATION FAILS |
|---|---|---|---|---|
| PIP3 | ACTIVE DIRECTORY | ☑ | ☐ | ☐ |
| PIP1 | ACTIVE DIRECTORY | ☐ | ☑ | ☐ |

— 84

[ADD] [DELETE]

[NEW] [DELETE]   [APPLY] [REVERT] [CLOSE]

Fig. 2B

| REALM POLICY | |
|---|---|
| REALM POLICIES | REALM POLICY DETAILS |

NAME: REALM POLICY 1

REALMS: REALM NAME(s)
XYZ.COM
GOODCORP.COM  ← 82

☐ NULL REALM
☐ ANY REALM

[+] [−]

| | DIRECTORY TYPE | FALLTHROUGH IF UNABLE TO CONNECT | FALLTHROUGH IF USER NOT FOUND | FALLTHROUGH IF AUTHENTICATION FAILS |
|---|---|---|---|---|
| PIP2 | LDAP | ☑ | ☑ | ☑ |
| PIP4 | LDAP | ☐ | ☐ | ☐ |

↙ 84

[ADD] [DELETE]

NAME
DEFAULT REALM POLICY
REALM POLICY 1

[NEW] [DELETE]

[APPLY] [REVERT] [CLOSE]

DISTRIBUTED AUTHENTICATION, AUTHORIZATION AND ACCOUNTING

CROSS REFERENCE TO RELATED APPLICATIONS

This application is a U.S. national phase application of International Application No. PCT/US2007/087259 entitled "DISTRIBUTED AUTHENTICATION, AUTHORIZATION AND ACCOUNTING," filed Dec. 12, 2007 and published in English on Jun. 26, 2008 as International Publication No. WO2008076760, and which claims priority to U.S. Provisional Application No. 60/869,881 filed on Dec. 13, 2006. Both are hereby incorporated by reference in their entirety for any and all purposes.

BACKGROUND

When a device connects to one or more computer networks, the device may be authenticated, authorized, and its activities on the one or more computer networks may be accounted for. Such a process is commonly referred to as Authentication, Authorization and Accounting ("AAA"; Accounting may be referred to alternatively as Auditing).

Authenticating a device prior to granting access to a computer network generally protects the network from unauthorized access. Before the device may gain access to the network, the device may be required to provide a credential, used to authenticate the device to the computer network. If the credential is recognized and deemed authentic, the device may be permitted access to the network. A credential may be a username and a password submitted from a user of the device, a digital certificate related to the device or the user thereof, a MAC address of the device, or the like.

Many different network authentication protocols and access policies are well-known and, accordingly, need not be set forth herein in detail. However, several different commonly encountered authentication protocols are generally described below to highlight the advantages and features of various embodiments.

One well-known standard that includes authentication is IEEE 802.1X. IEEE 802.1X provides a framework for several different authentication methods so that a Network Access Controller ("NAC"), such as a router, wireless access point, virtual private network ("VPN") device, or other similar device designed to facilitate access to a network, need not be cognizant of the authentication protocol being used. Instead, the NAC simply unpacks and repackages Extensible Authentication Protocol ("EAP") packets received from a device attempting to connect to a network and forwards the packets to a server that will perform the authentication.

In the terminology of the 802.1X standard, the connecting device to be authenticated may be called a supplicant. The server doing the authentication, such as a Remote Authentication Dial-In User Service ("RADIUS") server, may be called the authentication server. The device in between a supplicant and the authentication server, such as a wireless access point or port of a NAC, may be called the authenticator. An advantage of the 802.1X standard is that the authenticator may simply pass frames encapsulating the EAP packets between the supplicant and the authentication server.

When a device connects to a computer network, the authenticator may send an "EAP-Request/Identity" packet to the supplicant as soon as it detects that the link is active (e.g., a laptop computer with wireless capabilities establishes a wireless connection with a wireless access point). In situations where the authenticator supports local authentication methods, it may examine the type field of the response sent from the supplicant to determine whether to act on the packet itself or forward it to an authentication server. If the authenticator forwards the packet to the authentication server, the authentication server may send a challenge back to the authenticator, such as with a token password system, which the authenticator may forward to the supplicant.

Different authentication methods may vary this message, as well as the total number of messages required for authentication. EAP supports client only authentication and strong mutual authentication, the latter being particularly useful for wireless networks. The supplicant may respond to the challenge via the authenticator, which may forward the response to the authentication server. If the supplicant provides a valid credential, the authentication server may respond with a success message, which may be sent to the authenticator, which may in turn allow access to the computer network. As noted above, RADIUS is a common authentication protocol utilized by the 802.1X standard.

After authentication, authorization of a connecting device to a computer network provides for further control of connecting device's use of the computer network, including which network resources the device may access based on any number of user, device or network characteristics related to the device. In many ways, authorization is similar to authentication. However, authentication verifies that a particular device or the user of a device is who/what it purports to be. In contrast, authorization is the process of determining whether the authenticated device has the authority to perform a given operation or access a particular network resource.

Authorization standards may be described in ways similar to authentication standards. Once a user or device is authenticated, the NAC may take on the role of a policy enforcement point ("PEP"), and the authentication server (e.g., an AAA server such as a RADIUS server) may begin operating as a policy decision point ("PDP"). A PDP may be configured to store one or more authorization policies comprised of one or more rules, and to decide whether an authenticated device is permitted access to a particular resource by comparing characteristics of the device (or the user thereof, hereafter referred to as authorization information) to the rules of the authorization policies. The PDP may communicate its decision to the PEP at which the user or device is connected to the network, and the PEP may enforce the PDP's decision.

A further component of many authorization systems is a policy information point ("PIP"), which may be a role adopted by an authentication database from the authentication processes described above. Authorization information contained in PIPs (e.g., groups of which a user is a member, the user's role in a corporation, etc.) may be accessed by PDPs to make policy decisions.

SUMMARY

A first computer system, residing on a first computer network of a plurality of computer networks, is provided for controlling access to the plurality of computer networks. In some embodiments, the first computer system may be configured to: store authentication routing data comprising: address information related to at least two authentication databases against which credentials related to connecting devices may be authenticated, wherein at least one of the at least two authentication databases is contained on a second computer system residing on a second computer network; and a criterion for selecting which of the at least two authentication databases a given credential is authenticated against; receive a first credential from a network access controller on the first computer network, the first credential being relatable to a first connecting device requesting access to the plurality of computer networks at the network access controller; determine the criterion; based on the determined criterion, select a first authentication database of the at least two authentication databases against which the first credential is to be authenticated; communicate the first credential to the first authentication database using the address information; receive an authentication response from the first authentication database; and communicate the authentication response to the network access controller.

Other embodiments of the first computer system may be configured to: receive, from a second computer system, residing on a computer network different than the first computer network, at least a portion of an authorization policy comprising one or more rules for controlling a connecting device's access to the plurality of computer networks; store an authorization policy including the at least a portion of an authorization policy; receive first authorization information related to a first connecting device requesting access to the plurality of computer networks at a network access controller residing on the first network; compare the first authorization information to the authorization policy; and control the first connecting device's access to the plurality of computer networks based at least in part on the result of the comparison.

Another example provides for a storage medium, readable by a first processor of a first computer system residing on a first computer network of a plurality of computer networks, having embodied therein a program of commands executable by the first processor, may be provided. In some embodiments, the program may be adapted to be executed to: store authentication routing data comprising: address information related to at least two authentication databases against which credentials related to connecting devices may be authenticated, wherein at least one of the authentication databases is contained on a second computer system residing on a second computer network; and a criterion for selecting which of the at least two authentication databases a given credential is authenticated against; receive a first credential from a network access device on the first computer network, the first credential being relatable to a first connecting device requesting access to the plurality of computer networks at the network access device; determine the criterion; based on the determined criterion, select a first authentication database of the at least two authentication databases against which the first credential is to be authenticated; communicate the first credential to the first authentication database using the address information; receive an authentication response from the first authentication database; and communicate the authentication response to the network access device.

Other embodiments of a storage medium may be adapted to be executed to: receive, from a second computer system, residing on a computer network different than the first computer network, at least a portion of an authorization policy comprising one or more rules for controlling a connecting device's access to the plurality of computer networks; store an authorization policy including the at least a portion of an authorization policy; receive first authorization information related to a first connecting device requesting access to the plurality of computer networks at a network access device residing on the first network; compare the first authorization information to the authorization policy; and control the first connecting device's access to the plurality of computer networks based at least in part on the result of the comparison.

Another example provides for a method of controlling access to a plurality of computer networks, the plurality of computer networks including a first computer network with a first computer system and a network access device residing thereon, is provided. Some embodiments of the method may utilize the first computer system for performing the steps of: storing authentication routing data comprising: address information related to at least two authentication databases against which credentials related to connecting devices may be authenticated, wherein at least one of the authentication databases is contained on a second computer system residing on a second computer network; and a criterion for selecting which of the at least two authentication databases a given credential is authenticated against; receiving a first credential from the network access device, the first credential being relatable to a first connecting device requesting access to the plurality of computer networks at the network access device; determining the criterion; based on the determined criterion, selecting a first authentication database of the at least two authentication databases against which the first credential is to be authenticated; communicating the first credential to the first authentication database using the address information; receiving an authentication response from the first authentication database; and communicating the authentication response to the network access device.

In other embodiments, the method may perform the steps of: receiving, from a second computer system residing on a computer network different than the first computer network, at least a portion of an authorization policy comprising one or more rules for controlling a connecting device's access to the plurality of computer networks; storing an authorization policy including the at least a portion of an authorization policy; receiving first authorization information related to a first connecting device requesting access to the plurality of computer networks at the network access device; comparing the first authorization information to the authorization policy; and controlling the first connecting device's access to the plurality of computer of computer networks based at least in part on the result of the comparison.

DETAILED DESCRIPTION OF VARIOUS EMBODIMENTS

Figures 1, 8:
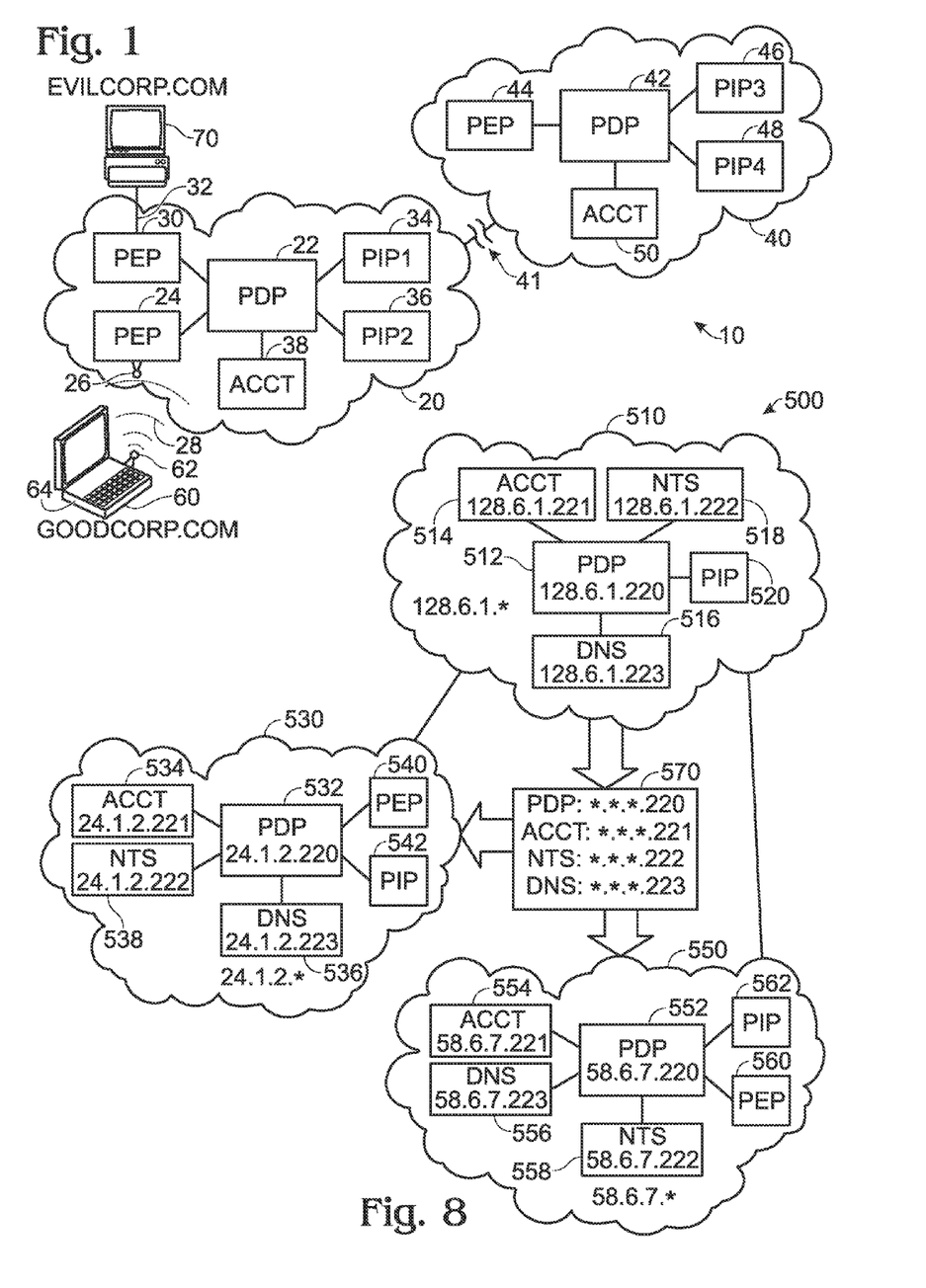
FIG. 1 depicts an example plurality of computer networks.
FIG. 8 depicts an example plurality of computer networks arranged in a hierarchal manner.

Referring now to FIG. 1, a plurality 10 of computer networks including a first computer network 20 and a second computer network 40 is disclosed. A computer network is defined generally herein as one or more interconnected computers and/or computer systems immediately accessible by one another. "Immediately accessible" may be understood to mean that communication between the interconnected computers and/or computer systems does not require passage through an intermediate routing device, such as a router, bridge, or other devices commonly used to connect two or more computer networks. Such an arrangement is often referred to as a local area network ("LAN").

First computer network 20 is shown including: a first policy decision point ("PDP") computer system 22; a first policy enforcement point ("PEP") device 24 having a wireless transmission interface 26 transmitting a wireless signal 28; a second PEP device 30 including a VPN interface 32; a first policy information point ("PIP") computer system 34; a second PIP computer system 36; and an accounting computer system 38.

Although the terms PDP, PEP and PIP may be used to describe solely authorization components (as discussed in the Background section), these terms are used in this specification and the accompanying figures to describe components related both to authorization and authentication.

Continuing with FIG. 1, second computer network 40 is shown connected to the first computer network 20 via connection 41. Second computer network 40 includes: a second PDP computer system 42; a third PEP device 44; a third PIP computer system 46; a fourth PIP computer system 48; and a second accounting computer system 50.

A PDP computer system such as computer system 22 or computer system 42 may comprise one or more computers configured to authenticate a credential associated with a connecting device (or the user thereof) against authentication databases contained on the PIP computer systems and to generate an authentication response. A PDP computer system may further be configured to authorize a connecting device (or the user thereof) to access particular network resources or perform particular operations on a plurality of computer networks such as the plurality 10 of computer networks. The authentication and authorization will be discussed further below.

A PEP device such as first PEP device 24, second PEP device 30 or third PEP device 44 may be a computer system, computer, or a simpler network appliance, any of which may be alternatively referred to as a NAC. NACs may be VPN gateways, wireless access points, or other network entry ports. A NAC may be configured to permit/deny access by a device to a computer network in response to an authentication response received by a PDP, as well as provision the user or device's access to various resources on the network in response to authorization decisions made by a PDP.

A PIP computer system such as first PIP computer system 34, second PIP computer system 36, third PIP computer system 46 or fourth PIP computer system 48 may provide network-level and/or application-level authentication. A PIP computer system may comprise one or more computers having one or more authentication databases such as Microsoft's® Active Directory ("AD") server, an LDAP server, Novell® eDirectory, Sun® Java System Directory Server, or other similar authentication databases used for storing user information for authentication purposes.

In addition to authentication, PIP computer systems may provide authorization information about a user of a device, such as groups of which the user is a member, the user's title (e.g., outside contractor), starting date of the user's employment, or the like. Additionally or alternatively, PIP computer systems may be configured to authenticate connecting devices based on attributes of the devices unrelated to users. For example, some PIP computer systems may have an authentication database configured to authenticate device based on attributes of the device (e.g., MAC address), instead of attributes of a user of the device. The terms "PIP computer system" and "authentication database" may be used interchangeably herein.

A connecting device such as a first connecting device 60 or a second connecting device 70 may be a computer, computer system or other device capable of connecting to the plurality 10 of computer networks, and may be a desktop computer, a personal digital assistant, a cellular phone, or other similar devices. Connecting devices may connect to the plurality 10 of computer networks at various PEP devices, such as first PEP device 24, second PEP device 30 or third PEP device 44. Devices may be operated by a user, or may be autonomous and unrelated to particular users. Devices may have supplicant computer programs (e.g., supplicant 64 on first connecting device 60) executing thereon.

In FIG. 1, first connecting device 60 is a laptop computer operated by a first user and is a member of the "goodcorp.com" realm. First connecting device 60 is shown connecting to the plurality 10 of computer networks at first PEP device 24 via the first device's wireless interface 62. Second connecting device 70 is a desktop computer operated by a second user and is member of the "evilcorp.com" realm. Second connecting device 70 is shown connecting to the plurality 10 of computer networks at second PEP device 30 via VPN connection 32.

I. Distributed Authentication

In some examples, distributed authentication may be provided. A device (or a user thereof) may have an associated credential, which may be usable by an authentication database on a PIP computer system to authenticate the device to a computer network. However, where there is a plurality 10 of computer networks as shown in FIG. 1, there may be multiple authentication databases executing on multiple PIP computer systems on various computer networks. In such a scenario, the authentication database against which the credential may be authenticated must be selected.

Accordingly, a PDP computer system such as first PDP computer system 22 or second PDP computer system 42 may be configured to store authentication routing data comprising address information related to at least two authentication databases against which a given credential may be authenticated, and a criterion for selecting which of the at least two authentication databases a given credential is authenticated against. Authentication routing data may be configured by administrative users using interfaces similar to the graphical user interfaces ("GUI") shown in FIGS. 2A and 2B.

The criterion may be usable to select one or more authentication database against which a credential may be authenticated. Example criterion used to select authentication databases may include the realm of a device connecting to a plurality of networks (e.g., an employee at Evil Corporation may be using a device which is a member of the "evilcorp.com" realm). Additionally and/or alternatively, the criterion may include attributes of the connecting device or the NAC, such as the time of day at which the connecting device is connecting to the plurality of computer networks, groups of which the user of the connecting device is a member, the user's title, the user's privileges, characteristics of the connection between the connecting device and the PEP (e.g., wireless, VPN), or attributes of the NAC, to name a few.

Address information may include information about two or more authentication databases and the PIP computer systems on which they execute. This may include the type of authentication database (e.g., Active Directory, LDAP), the network address of the PIP computer system on which the authentication database is executing, and the like.

There may be more than one authentication database associated with an outcome of a criterion. The first listed authentication database may be the primary authentication database, and the later listed authentication databases may serve as alternates if the first authentication database is unable to authenticate a credential. An authentication database may be unable to authenticate a credential for multiple reasons, such as a disrupted network connection to the PIP computer system on which the authentication database is executing, the credential (e.g., username) is not found in the authentication database, or authentication for a credential failed.

Authentication routing data may be configured directly at a PDP computer system for use with the PDP computer system's local network. Additionally or alternatively, authentication routing data may be wholly or partially received (or inherited) from other PDP computer systems located on different computer networks.

Figure 2A:
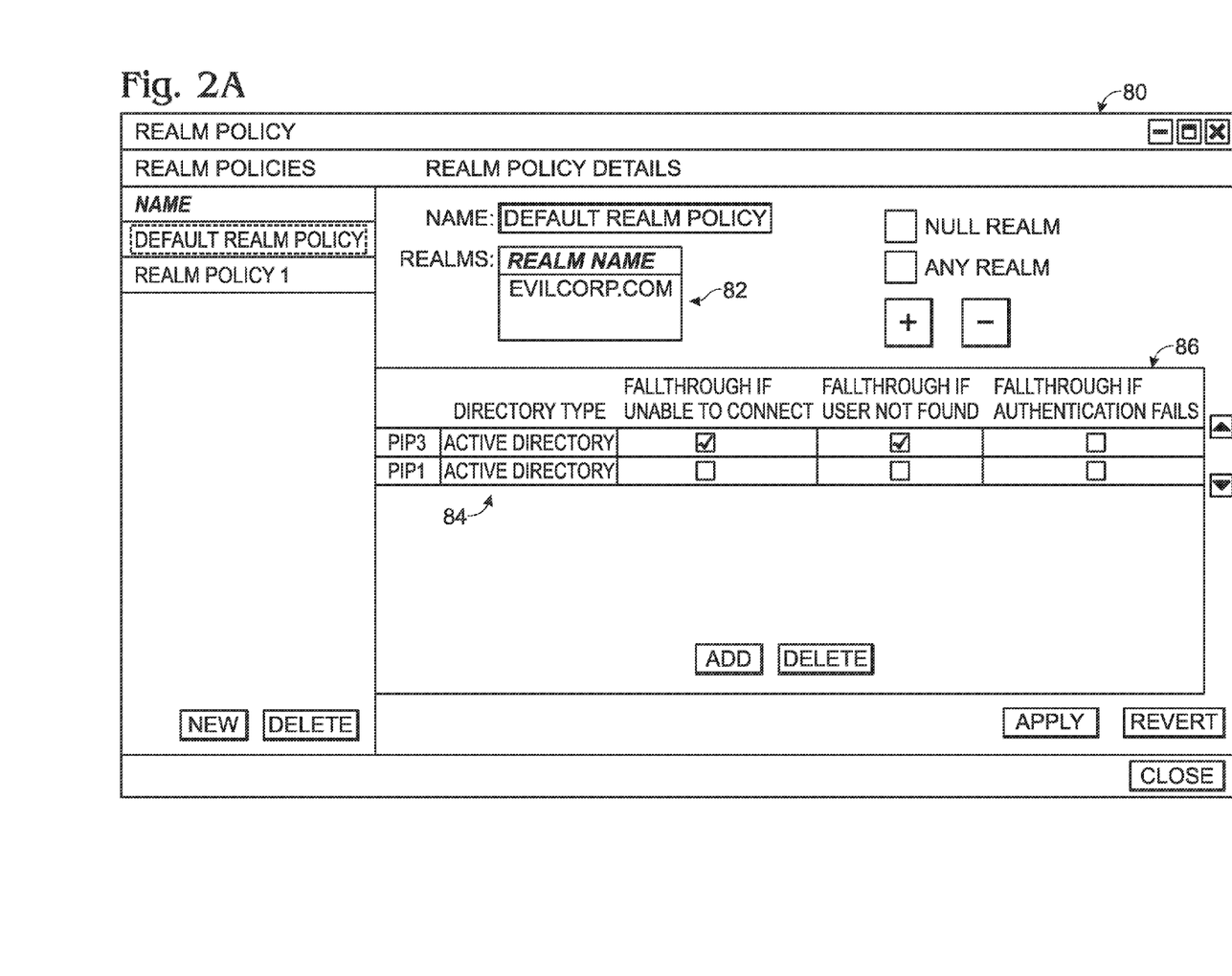
FIGS. 2A and 2B depict example graphical user interfaces which may be used to configure identity routing criterion.
Figure 2B:
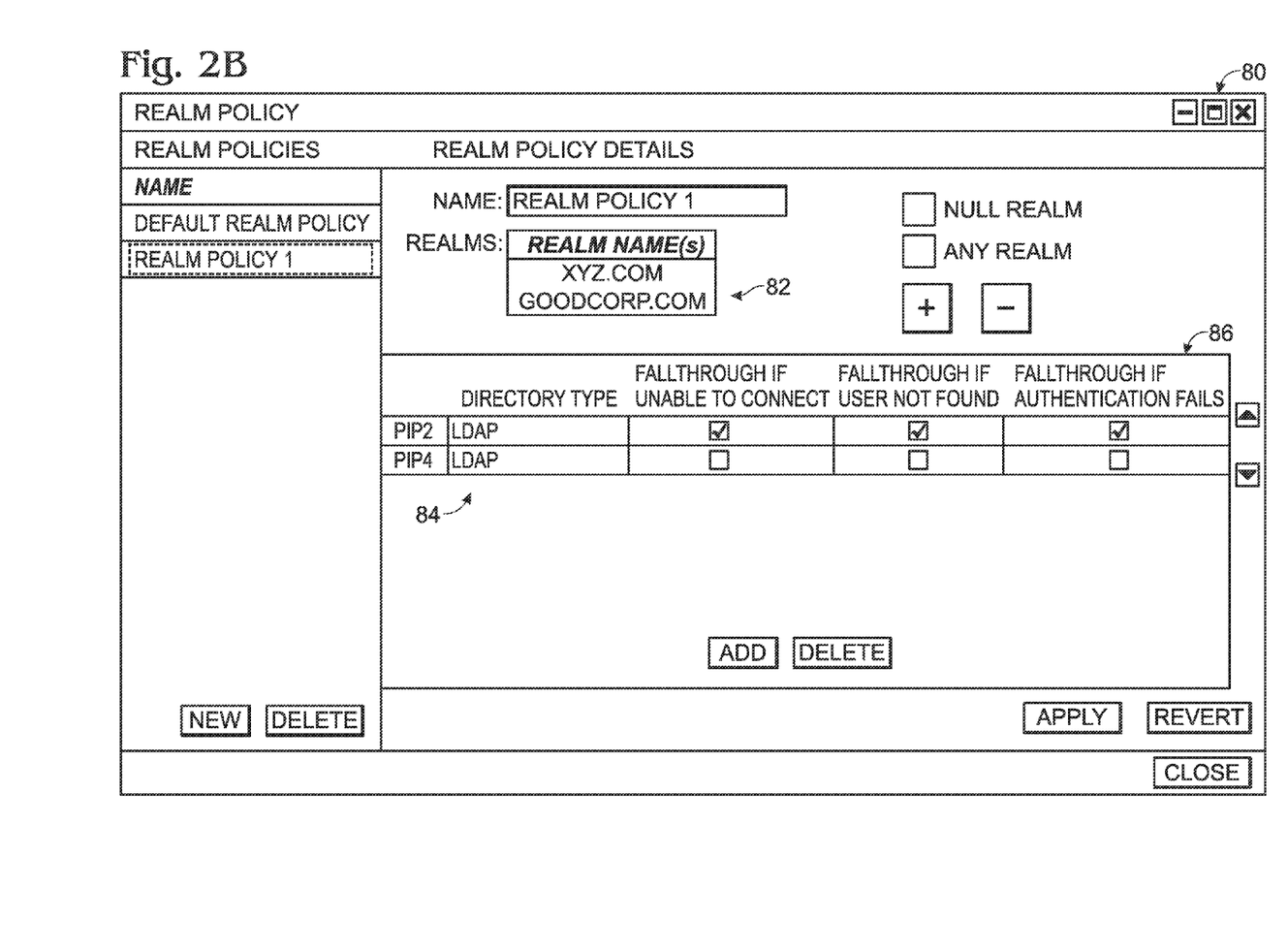

In FIGS. 2A and 2B, the criterion for selecting which authentication database a given credential is authenticated against is the realm of the user and/or device attempting to gain access to the plurality 10 of computer networks. Other criterion, such as access method or group membership of a user may also be used.

GUI 80 may be used to configure a realm policy, such as the DEFAULT REALM POLICY, which may dictate the criterion used to select the authentication database. The DEFAULT REALM POLICY includes a list of realms 82 to which it applies. As seen in FIG. 2A, DEFAULT REALM POLICY is applicable for devices from "evilcorp.com" realm, of which for example second connecting device 70 is a member.

Address information 84 shown in FIG. 2A indicates that authentication databases may be executing on the PIP computer systems 46 and 34 shown in FIG. 1. If the DEFAULT REALM POLICY applies, then the credential may be authenticated against third PIP computer system 46 first. As illustrated by the fall-through provisions 86, if the PDP computer system is unable to connect to third PIP computer system 46 (e.g., because network connection 41 is down), or if a credential is not recognized at third PIP computer system 46 (e.g., a username is not found), the PDP computer system may fall through and authenticate the credential against first PIP computer system 34. However, if authentication at third PIP computer system 46 fails, the fall-through provisions in FIG. 2A dictate that the PDP computer system not attempt to authenticate the credential against first PIP computer system 34.

Similar to the realm policy shown in FIG. 2A (and using the same reference numerals), the GUI 80 depicted in FIG. 2B may be used to configure "REALM POLICY 1." REALM POLICY 1 is applicable for users/devices from either the "xyz.com" realm or the "goodcorp.com" realm, as indicated in the list 82 of realms.

Figure 3:
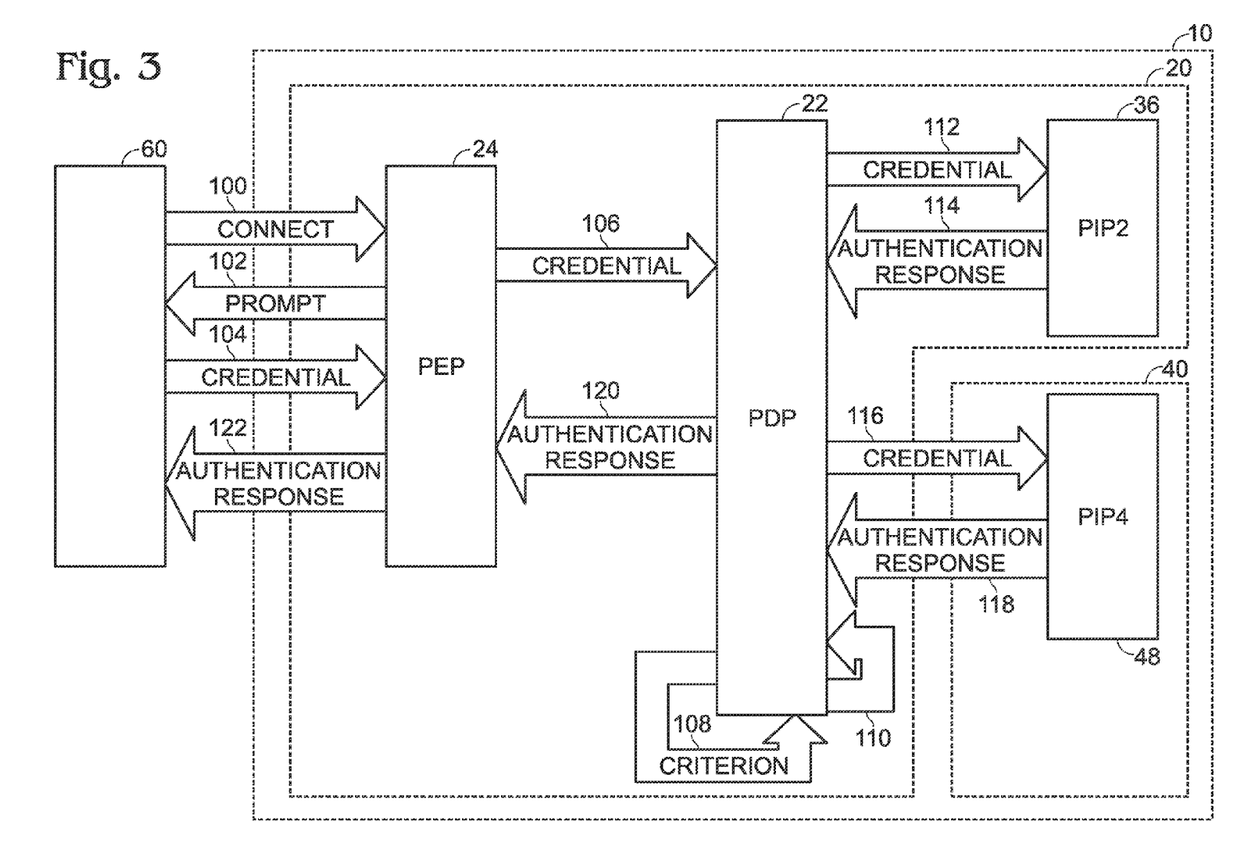
FIG. 3 depicts an example method of authentication routing.

An example authentication process is depicted in FIG. 3, and will be described using first connecting device 60 in FIG. 1 as a connecting device and the REALM POLICY 1 of FIG. 2B as the applicable realm policy. In step 100, first connecting device 60 contacts first PEP device 24 using a wireless signal 28 in order to establish a connection to the plurality 10 of computer networks. In step 102, using known protocols such as EAP, first PEP device 24 prompts first connecting device 60 for a credential usable to authenticate first connecting device 60 (or a user thereof) to the plurality 10 of computer networks.

In step 104, first connecting device 60 transmits the credential to first PEP device 24. In step 106, first PEP device 24 forwards the credential to PDP computer system 22. In step 108, PDP computer system 22 determines a criterion, which in this example may mean selecting an applicable realm policy, to be used to select which authentication database is to be used to authenticate the received credential.

In step 110, first PDP computer system 22 may use the criterion and the realm of first connecting device 60 ("goodcorp.com") to select a first authentication database (e.g., by selecting an applicable realm policy) against which the credential should be authenticated. Because first connecting device 60 is a member of the "goodcorp.com" realm, first PDP computer system 22 selects REALM POLICY 1, which designates second PIP computer system 36 as hosting the appropriate authentication database against which to authenticate the received credential, and fourth PIP computer system 48 as hosting an alternate authentication database.

In step 112, first PDP computer system 22 may communicate the credential to the selected authentication database at second PIP computer system 36. The credential may be authenticated at second PIP computer system 36 and an authentication response may be returned to first PDP computer system 22 at step 114. If a connection to second PIP computer system 36 cannot be established, the credential is not found, or if authentication at second PIP computer system 36 fails, fall through provisions 86 of FIG. 2B dictate that first PDP computer system 22 should attempt to authenticate at fourth PIP computer system 48 in steps 116 and 118.

In either case, at step 120, the authentication response received by first PDP computer system 22 may be communicated to first PEP device 24, so that first PEP device 24 may use the response to determine access for first connecting device 60. Optionally, at step 122, first PEP device 24 may communicate the contents of the authentication response to first connecting device 60.

According to another aspect of distributed authentication, a PDP computer system may include a cache of credentials collected in previous authentications. Using such a cache, if a connecting device submits a credential that cannot be authenticated at a local PIP computer system, and if connections to computer networks having applicable PIP computer systems cannot be established, a PDP computer system may authenticate the credential against its cache of collected credentials. The cache may be configured to purge or deactivate cached credentials after a certain time period (i.e., time-to-live). Alternatively, the PDP computer system may check to see whether a credential is expired.

Referring to an example in FIG. 1, a PDP computer system 22 may be configured to cache a copy of a first credential after the first credential has been authenticated at a PIP computer system such as first PIP computer system 34, second PIP computer system 36, third PIP computer system 46 or fourth PIP computer system 48. PDP computer system 22 may be further configured to, upon receipt of a subsequent second credential, authenticate the second credential against the cached copy of the first credential, instead of or in addition to authenticating the second credential against an authentication database executing on a PIP computer system.

Figure 4:
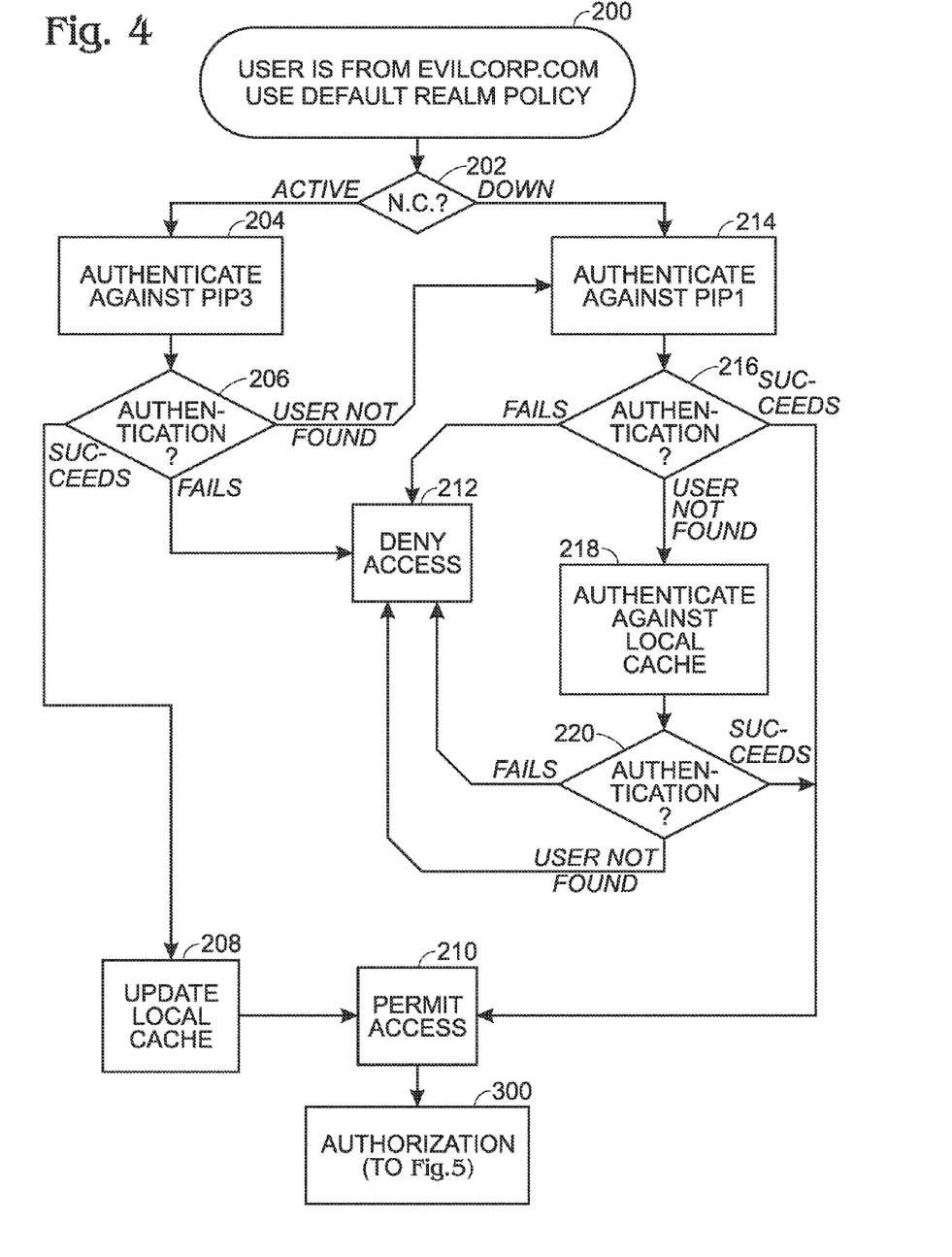
FIG. 4 depicts a more detailed example method of authentication routing.

FIG. 4 depicts a scenario where second connecting device 70, which is a member of the "evilcorp.com" realm, connects to the plurality 10 of computer networks. After second connecting device 70 connects to second PEP device 30 and submits a credential, which second PEP device 30 forwards to first PDP computer system 22, at step 200, the first PDP computer system 22 may use the criterion (realm) to determine that the DEFAULT REALM POLICY shown in FIG. 2A applies. At step 202, a determination may be made of whether the network connection between first PDP computer system 22 and third PIP computer system 46 is active.

If it is active, then the credential may be authenticated against third PIP computer system at step 204. At step 206, a determination may be made of whether the authentication was successful. If it was, then at step 208, the first PDP computer system 22 may update its local cache of credentials to include a cached copy of the credential received from second connecting device 70. Then, at step 210, first PDP computer system 22 may permit access to the plurality 10 of computer networks, subject to possible authorization restrictions determined at step 300 and beyond.

If the determination at 206 was that the authentication failed (i.e., the credential was invalid), then at step 212, the first PDP computer system 22 may deny access to second connecting device 70.

If the determination at step 202 was that the network connection is down (e.g., connection 41 is broken), or if the determination at step 206 was that the credential was not found (e.g., no matching username), then FIG. 2A's fall through provisions 86 dictate that first PDP computer system 22 may authenticate the credential against first PIP computer system 34 at step 214 instead.

At step 216, a determination may be made of whether the authentication of step 214 was successful. If it was, then first PDP computer system 22 grants access to second connecting device 70 at step 210. If the authentication of step 214 was unsuccessful, then first PDP computer system 22 may deny access to second connecting device 70 at step 212.

If, on the other hand, the authentication of step 214 fails because the credential is not found, then first PDP computer system 22 may authenticate the credential against its own cache of credentials (such as those obtained in previous executions of step 208) at step 218. At step 220, a determination may be made of whether the authentication of step 218 was successful. If the authentication was successful, then first PDP computer system 22 may permit access at step 210. If the authentication against the local cache was unsuccessful, e.g., the credential was invalid or a matching credential in the cache expired, then first PDP computer system 22 may deny access at step 212.

II. Distributed Authorization

Another example provides for distribution of authorization policies among multiple PDP computer systems. PDP computer systems may use authorization policies to control connecting devices' access to a plurality of computer networks.

Distribution of authorization policies may occur in various ways. In some embodiments, the distribution of authorization policies may be hierarchal. For example, a PDP computer system on a first computer network may be designated a hub PDP. PDP computer systems residing on other computer networks may be designated node PDPs (an example of such a distribution is shown in FIG. 8, which is discussed later). The nodes may inherit some or all of their authorization policies from the hub.

In other embodiments, the distribution may occur in real time; i.e. if one PDP computer system lacks an authorization policy applicable to a given connecting device, it may query PDP computer systems on other networks for applicable authorization policies. In yet other embodiments, the distribution may occur at predetermined intervals, or upon command by an administrative user.

Returning to FIG. 1, first PDP computer system 22 may store one or more authorization policies, each policy comprising one or more rules for controlling a connecting device's access to the plurality 10 of computer networks. Second PDP computer system 42 may periodically receive (or inherit in a hierarchal system) at least a portion of its authorization policies from first PDP computer system 22. Second PDP computer system 42 may additionally or alternatively query first PDP computer system 22 for an authorization policy as needed. Second PDP computer system 42 also may be configured with one or more local authorization policies, which may extend beyond the authorization policies it received or inherited. Second PDP computer system 42 may pass on its authorization policies to yet other PDP computer systems (not shown in FIG. 1).

Authorization policies, and more specifically the rules which comprise the policies, may be compared to authorization information, related to a connecting device such as first connecting device 60 or second connecting device 70 and received from various sources, to control access by the connecting device to the plurality 10 of computer networks.

Authorization information may include attributes of: the connecting device, such as its hardware or software configuration; a user of the connecting device, such as group membership, security clearance or employment status; the network connection between the connecting device and the plurality of computer networks; the PEP device (a.k.a. NAC) at which the device is connecting to the plurality of computer networks; or other similar information. These attributes may be compared with rules contained in authorization policies, and a connecting device's access to the plurality 10 of computer networks may be controlled based on a result of the comparison.

Authorization information may be received by a PDP computer system such as first PDP computer system 22 or second PDP computer system 42 from various sources. In some embodiments, after a PIP computer system has authenticated a credential related to a connecting device or a user thereof, the PIP computer system may send authorization information, such as attributes of the user of the connecting device, to the PDP computer system (e.g., in steps 114 or 118 of FIG. 3). Authorization information may also be received by a PDP computer system from PEP devices such as first PEP device 24, second PEP device 30 or third PEP device 44, as well as from connecting devices such as first connecting device 60 or second connecting device 70.

Controlling access to a plurality of computer networks may include permitting, denying, or restricting a connecting device's access to a plurality of computer networks. Restricting may include determining which network resources the connecting device may access and limiting the device's access accordingly. For example, controlling a connecting device's access to a plurality of computer networks may include instructing a NAC to permit the connecting device access to a first network resource residing on the plurality of computer networks and deny the connecting device access to a second network resource residing on the plurality of computer networks.

Controlling access may also include invoking obligations which the PEP device, at which the device is connecting to the plurality of computer networks, must enforce. Obligations may require that the PEP device give the connecting device access to a plurality of computer networks, but the access may be subject to the obligations. One example of an obligation would be to require that a connecting device use a particular virtual LAN ("VLAN"). Another example of an obligation may require that a PEP device log specific information about a connecting device's access to the plurality of computer networks. Other types of obligations are contemplated.

In some embodiments, an authorization policy may include a rule for controlling access to a plurality of computer networks based on attributes of a PEP device (alternatively referred to as a NAC) through which a connecting device requests access to the plurality of computer networks, and the authorization information may include attributes of the PEP device through which the connecting device is requesting access to the plurality of computer networks.

For example, in FIG. 1, first PDP computer system 22 may have an authorization policy including a rule that devices connecting through wireless access points may be limited to a particular VLAN. First connecting device 60 is a wireless device, which connects to the plurality 10 of computer networks via first PEP device 24, a wireless access point. Hence, authorization information related to the connection of first connecting device 60 to the plurality 10 of computer networks may indicate that first PEP device 24 is a wireless access point. First PDP computer system 22 may compare the authorization information to its authorization policy to determine that first connecting device 60 is to be limited to the particular VLAN.

Other embodiments may include an authorization policy having a rule for controlling access to a plurality of computer networks based on a time of day at which a connecting device requests access to the plurality of computer networks, and the authorization information may include the time of day at which the connecting device is requesting access to the plurality of computer networks. For example, assume that first connecting device 60 connects to plurality 10 of computer networks at 3:30 am. An applicable authorization policy may include a rule dictating that connecting devices are only permitted access to the plurality 10 of computer networks between 9 am and 5 pm. Likewise, the authorization information associated with first connecting device 60 may include a connection time of 3:30 am. Thus, the authorization information associated with first connecting device 60 may be compared to the authorization policy to determine that first connecting device 60 is not authorized to access the plurality 10 of computer networks.

Yet other embodiments may implement an authorization policy including a rule for controlling access to a plurality of computer networks based on attributes of one or more groups of which a user of a connecting device is a member, and the authorization information may include attributes of one or more groups of which the user of the connecting device is a member.

For instance, an authorization policy may include a rule dictating that users who are members of a CONTRACTORS group may be forbidden access to resources on the plurality 10 of computer networks related to finance. When a device used by a member of the CONTRACTORS group connects to the plurality 10 of computer networks, authorization information associated with the device may indicate that the user thereof is a member of the CONTRACTOR group. Thus, the authorization policy may be compared to the contractor's authorization information to determine that the contractor should be forbidden access to finance resources on the plurality 10 of computer networks.

Figure 5:
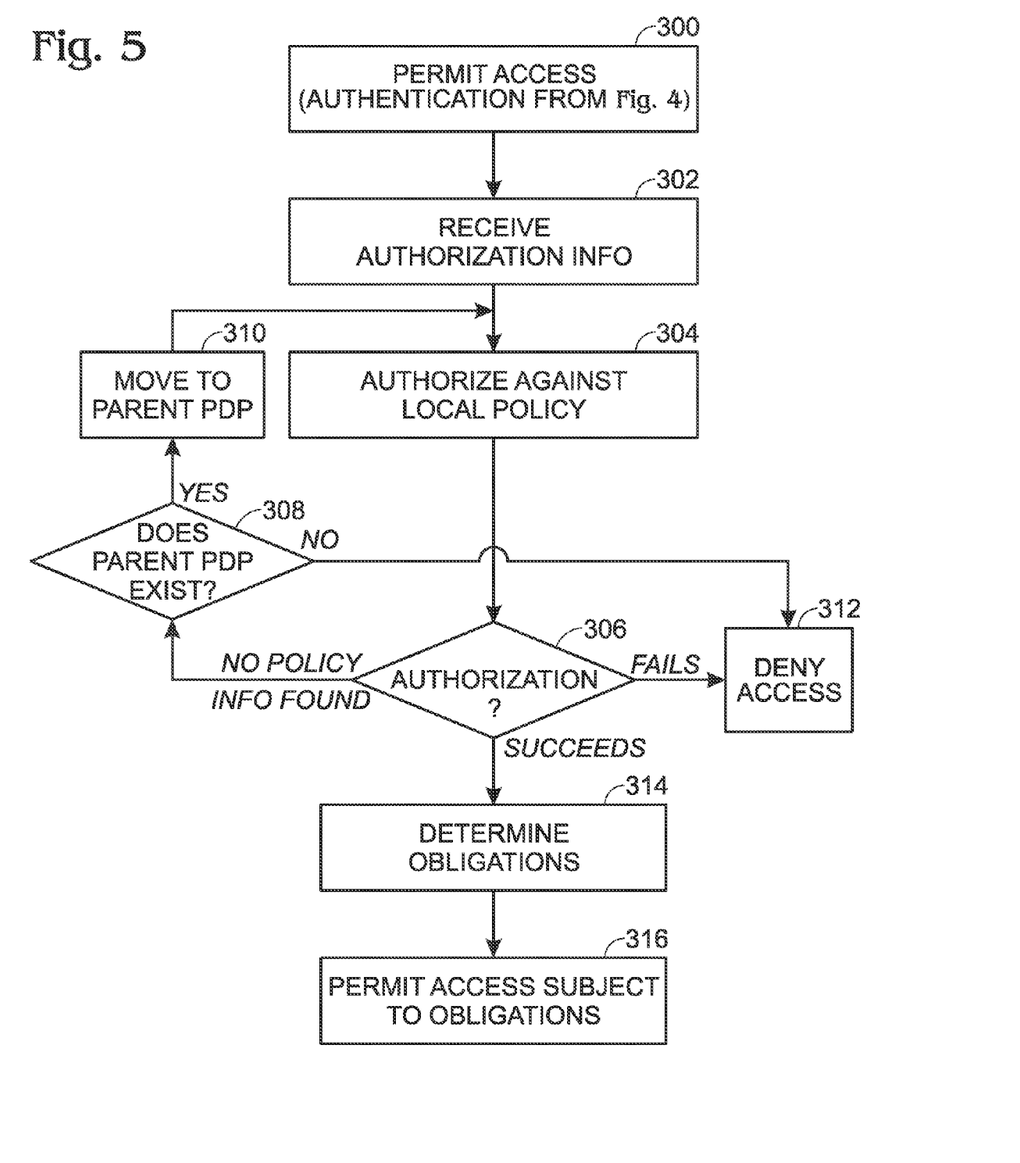
FIG. 5 depicts an example method of distributed authorization.

An example process for authorizing an authenticated connecting device is shown in FIG. 5. In step 300, the connecting device (e.g., first connecting device 60) has been authenticated, as depicted in FIG. 4. In step 302, authorization information may be received at a PDP computer system such as first PDP computer system 22 from various sources as described above. In step 304, the received authorization information may be compared to a local authorization policy. In step 306, a determination may be made of whether the authorization succeeded.

If no applicable authorization policy was found, in some embodiments, a determination may be made at step 308 of whether a PDP having an applicable authorization policy (such as a parent PDP in hierarchal distributions) exists. If such a PDP computer system exists, the process may move to (or query) that PDP computer system at step 310 and compare the received authentication information to an authorization policy of the parent PDP computer system in step 304.

Returning to the determination made at step 306, if an applicable authorization policy is found, but authorization fails, access to the plurality of computer networks may be denied at step 312. If, on the other hand, authorization is successful, then obligations may be determined at step 314, and access may be permitted to the connecting device, subject to the determined obligations, at step 316.

Figure 6:
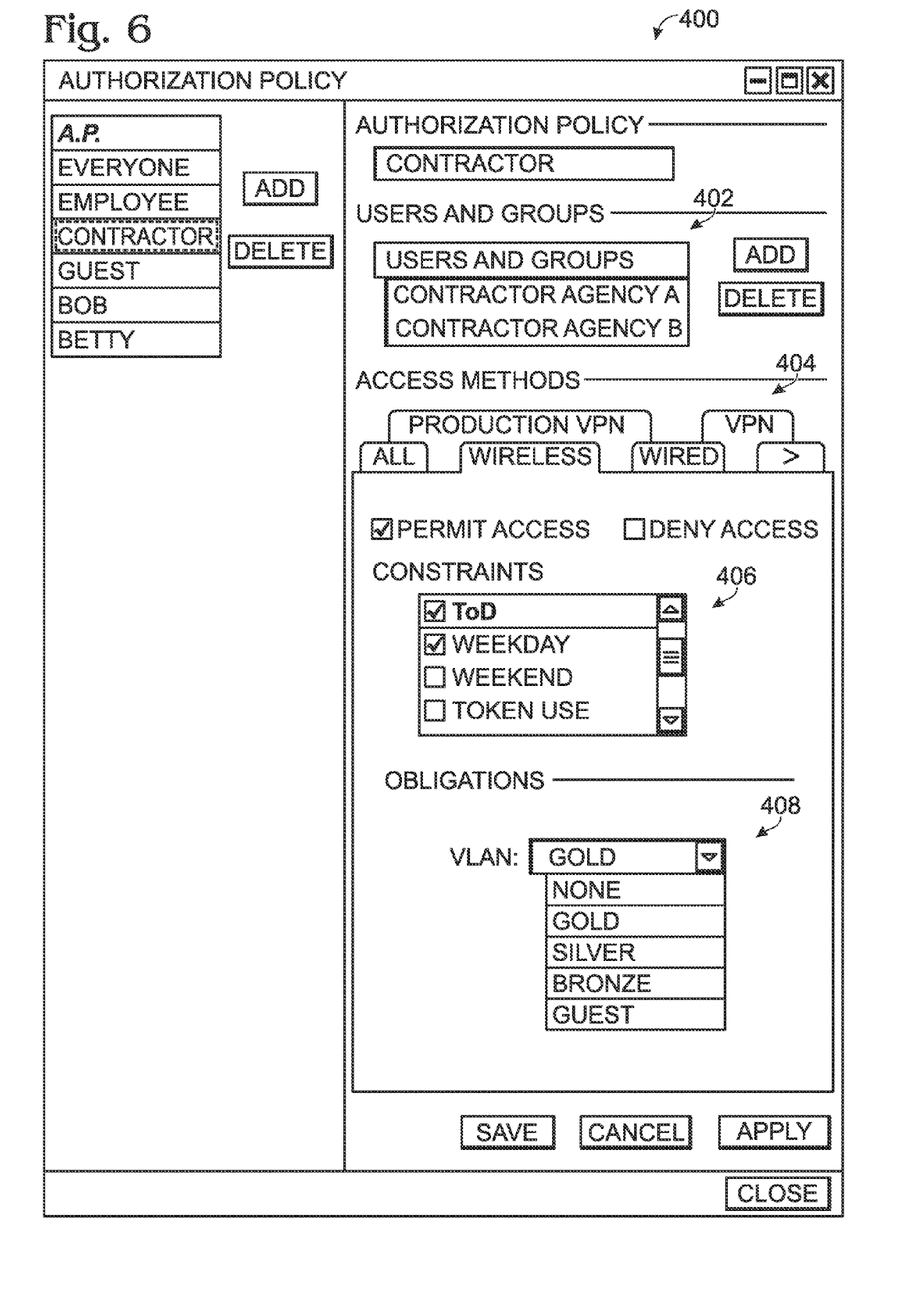
FIG. 6 depicts an example graphical user interface which may be used to configure authorization policies.

In some embodiments, rules may be nested within other rules. FIG. 6 depicts a GUI 400 for configuring an authorization policy. In this example, the authorization policy being configured is named "CONTRACTOR." This authorization policy may be applicable to users that are members of the groups listed in a list 402 of users and groups. The authorization policy further includes rules in the form of access methods 404, constraints 406 and obligations 408.

Using first connecting device 60—a wireless device—as an example, and assuming that the user of first connecting device 60 is a member of the group CONTRACTOR AGENCY A, the CONTRACTOR authorization policy shown in FIG. 6 is applicable. Because first device's 60 access method is wireless, the constraints 406 and obligations 408 associated with wireless access apply. Hence, the Time of Day ("ToD") and the weekday constraints 406 are to be enforced. Additionally, the GOLD VLAN obligation 408 is shown to be selected, which indicates that the connecting device should be obliged to connect to a VLAN designated as GOLD (which may be defined elsewhere).

Figure 7:
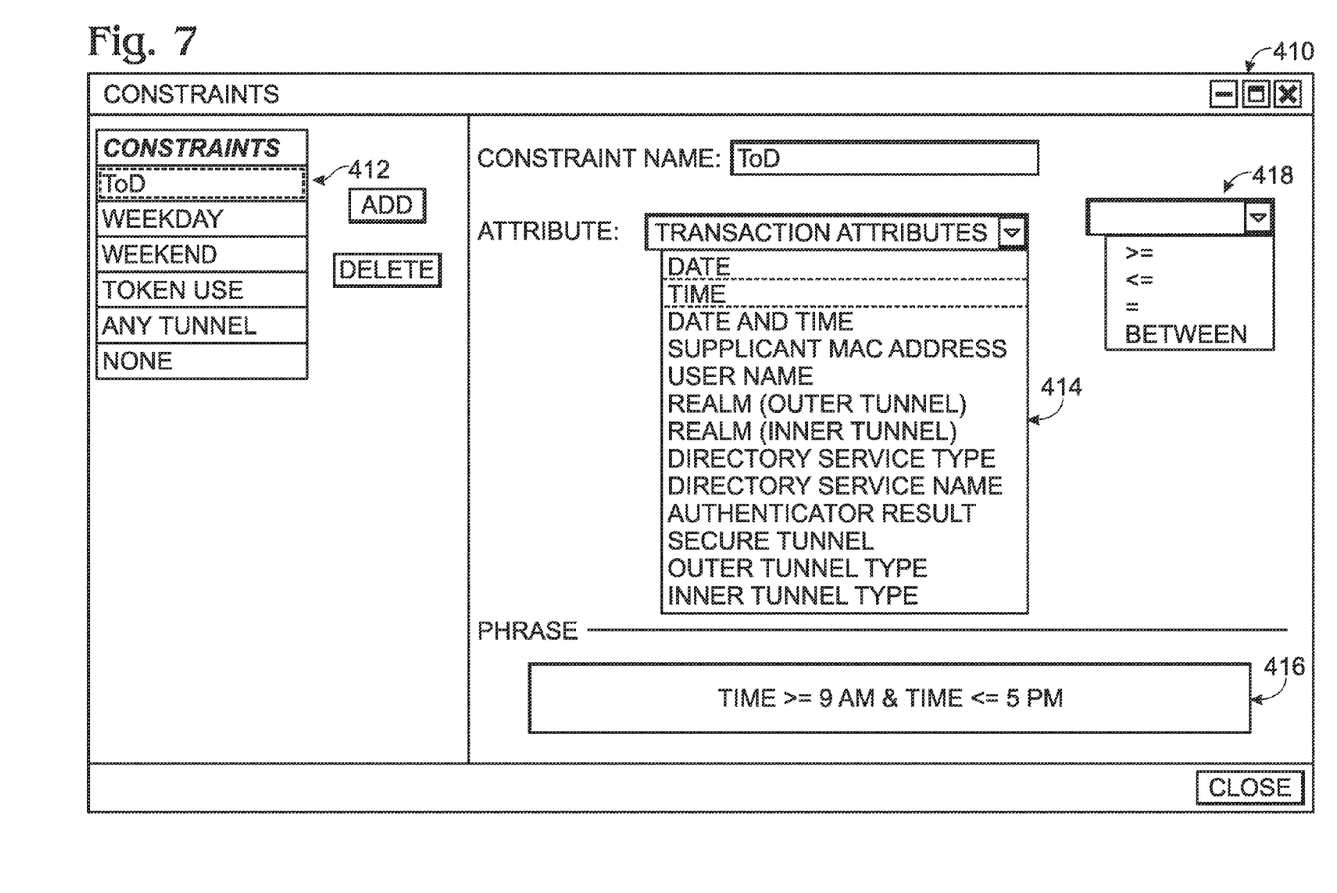
FIG. 7 depicts an example graphical user interface which may be used to configure a type of rule known as a constraint.

FIG. 7 depicts a GUI 410 for configuring constraints. GUI 410 may contain a list of constraints 412 which may be configured or edited, a list 414 of attributes which may be compared to various values in each constraint, and a phrase 416 setting forth the complete constraint (i.e., the rule). An administrative user may select attributes from the list 414 of attributes that may appear in phrase 416, and/or the administrative user may manually edit phrase 416. The GUI may contain additional interfaces 418 (e.g., selection boxes, radio buttons, pull-down lists) configured to add boolean or other comparators to phrase 416.

The GUI 410 shown in FIG. 7 is shown having the constraint named ToD selected for editing. The value "TIME" is selected in the list 414 of attributes, which may cause the attribute TIME to appear in the phrase 416. Phrase 416 has been edited so that the ToD constraint returns true if the attribute TIME is between 9 AM and 5 PM, and false otherwise.

Referring back to FIG. 6, the ToD and a Weekday constraints are selected for the wireless access method. Above the list of constraints 406 are two selection boxes, PERMIT ACCESS and DENY ACCESS. In this example, PERMIT ACCESS is selected, indicating that if the selected constraints return true, then access to a plurality of computer networks should be permitted.

Continuing with the previous example, if a user who is a member of CONTRACT AGENCY A connects to the plurality 10 of computer networks using first connecting device 60 (which is wireless) between 9 am and 5 pm on a weekday, the selected constraints will return true, indicating that first connecting device 60 should be permitted access to the plurality of computer networks. In addition, first connecting device 60 should be obligated to use the GOLD VLAN.

III. Distributed Accounting

Some examples may provide for distributed accounting. Accounting may be performed by accounting computer systems, which may be one or more computers forming part of a PDP computer system, including a single computer functioning as both the accounting computer system and the PDP. Accounting computer systems may be alternatively separate from PDP computer systems.

Accounting computer systems may be configured to monitor connecting devices' access to a plurality of computer networks, store records of events involving connecting devices' use of the plurality of computer networks, and transmit at least some of these records between one another.

FIG. 8 depicts a hierarchal plurality 500 of computer networks. The components of the plurality 500 of computer networks may be similar to the components depicted in the plurality 10 of computer networks shown in FIG. 1. The plurality 500 of computer networks includes a root computer network 510, a first node computer network 530 and a second node computer network 550.

Root computer network 510 may include a root PDP computer system 512 and a root accounting computer system 514. Root computer network 510 may further include other network resources such as a root domain name server ("DNS") 516, a root network time server ("NTS") 518, and a root PIP device 520. It should be understood that these other network resources are selected for illustrative purposes only, and may include other types of computer servers or network components.

First node computer network 530 is shown including a first node PDP computer system 532, a first node accounting computer system 534, and other network resources such as a first node DNS 536, a first node NTS 538, a first node PEP device 540, and a first node PIP computer system 542. Second node computer network 550 is shown including a second node PDP computer system 552, a second node accounting computer system 554, and other network resources such as a second node DNS 556, a second node NTS 558, a second node PEP device 560, and a second node PIP computer system 562.

First node accounting computer system 534 and second node accounting computer system 554 may be configured to monitor devices connecting to first node computer network 530 and second node computer network 550, respectively.

Monitoring a connecting device's use of the plurality 500 of computer networks may be accomplished using various methods. In some embodiments, an accounting computer system such as root accounting computer system 514, first node accounting computer system 534 or second node accounting computer system 554 may monitor network traffic on its respective network. In other embodiments, an accounting computer system may instruct PEP devices (e.g., a first node PEP device 540, second node PEP device 560) on its local network to monitor a connecting device's activities, and the PEP device may communicate a log of those monitored events to the accounting computer system.

In either case, an accounting computer system may store one or more records of the monitored events. Once stored, the accounting computer system may be configured to select a subset of the monitored events, based on internal parameters, and transmit the subset of events to another accounting computer system on a different computer network. In the example depicted in FIG. 8, the first node accounting computer system 534 and the second node accounting computer system 554 may be configured to select a subset of their stored records of events, and transmit the subsets up to the root accounting computer system 514.

Internal parameters used to select subsets of events to send to other accounting computer systems may be configured in various ways. In some embodiments, internal parameters may be configured to dictate that events related to a connecting device's access of a certain type of network resource (e.g., financial) may be transmitted to another accounting computer system. In other embodiments, events related to connecting devices using a certain type of connection (e.g., wireless) may be transmitted to another accounting computer system.

In yet other embodiments, events related to users belonging to a particular group may be transmitted to another accounting computer system. For instance, a user may be a member of the group called GUESTS, which may be a group created to allow temporary access to the plurality 500 of computer networks. In such a case, internal parameters of an accounting computer system may be configured so that the accounting computer system transmits events associated with that user to a higher-level accounting computer system, such as root accounting computer system 514.

IV. Distributed Network Parameters

Another example provides for distribution of network parameters. A PDP computer system such as first PDP computer system 22 or second PDP computer system 42 of FIG. 1, or root PDP computer system 512, first node PDP computer system 532 or second node PDP computer system 552 of FIG. 8, may be configured to store network service parameters allocating at least one logical address for a first type of network resource, and to provide a network resource of the first type, executing on a computer or computer system residing on the same computer network as the PDP computer system, with an address containing the logical address. Further, the PDP computer system may be configured to, prior to storing the network service parameters, receive or inherit the network service parameters from another PDP computer system residing on a different computer network.

Referring to FIG. 8, root PDP computer system 512 may be configured with network service parameters 570 allocating logical addresses to various types of network resources. The network service parameters 570 may be communicated (as shown in FIG. 8) to lower PDP computer systems such as first node PDP computer system 532 or second node PDP computer system 552.

The example network service parameters 570 in FIG. 8 include four different logical addresses allocated for four types of network resources. PDP computer systems may adopt IP addresses having a final octet of 220. Similarly, accounting computer systems, such as root accounting computer system 514, first node accounting computer system 534 and second node accounting computer system 554, may adopt IP addresses containing a common final octet of 221. NTS servers such as root NTS 518, first node NTS 538 or second node NTS 558 may adopt IP addresses having a final octet of 222, and DNS servers such as root DNS 516, first node DNS 536 or second node DNS 556 may adopt IP addresses having a final octet of 223.

For example, components on root computer network 510 may have in common the first three octets of 128.6.1.*. Using network service parameters 570, each component on root network 510 may adopt the final octet designated in network parameters 570. Root PDP computer system 512 may then forward network service parameters 570 to first node computer network 530 and second node computer network 550, so that first node PDP computer system 532 and second node PDP computer system 552 may ensure that network resources on their respective computer networks adopt the designated final octets.

In some embodiments, a PDP computer system may ensure that network resources adopt the logical addresses dictated by network service parameters by instructing a local DNS server to reserve the appropriate octets (e.g., network service parameters 570 would require that final octets 220-223 be reserved) and to assign those octets to the appropriate network resources. In other embodiments, a DNS server may incorporated into a PDP computer system, and therefore the PDP computer system may enforce network service parameters itself.

While the above discussion of network service parameter distribution refers to a hierarchal plurality of computer networks such as plurality 500 of computer networks, it should be understood that the methods and systems are equally applicable to non-hierarchal pluralities of computer networks, such as plurality 10 of computer networks in FIG. 1. Moreover, while accounting, DNS and NTS network resources are described, it should be understood that other network resources may be assigned logical addresses according to network service parameters. Finally, while IP addresses are discussed above and illustrated in FIG. 8, it should be understood that the above discussion is equally applicable to other network addressing schemes.

Accordingly, while embodiments of distributed authentication, authorization and accounting computer systems, storage mediums and methods have been particularly shown and described with reference to the foregoing disclosure, many variations may be made therein. Various combinations and sub-combinations of features, functions, elements and/or properties may be used. Such variations, whether they are directed to different combinations or directed to the same combinations, whether different, broader, narrower or equal in scope, are also regarded as included within the subject matter of the present disclosure. The foregoing embodiments are illustrative, and no single feature or element is essential to all possible combinations that may be claimed in this or later applications. The claims, accordingly, define selected embodiments disclosed in the foregoing disclosure. Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A first computer system, residing on a first computer network of a plurality of computer networks, for controlling access to the plurality of computer networks, the first computer system configured to:
    receive a first credential from a network access controller on the first computer network, the first credential being associated with a first connecting device requesting access to the plurality of computer networks at the network access controller;
    select, using a criterion, at least one authentication routing policy from a plurality of authentication routing policies, each authentication routing policy of the plurality of authentication routing policies comprising:
        address information associated with at least two authentication databases against which the first credential associated with the first connecting device may be authenticated, wherein at least one of the at least two authentication databases is contained on a second computer system residing on a second computer network;
    select a first authentication database of the at least two authentication databases of the selected at least one authentication routing policy against which the first credential is to be authenticated;
    communicate the first credential to the first authentication database using the address information;
    receive an authentication response from the first authentication database; and
    communicate the authentication response to the network access controller.

2. The first computer system of claim 1 further configured to cache a copy of the first credential.

3. The first computer system of claim 1 further configured to receive a second credential and authenticate the second credential against the cached copy of the first credential.

4. The first computer system of claim 1 wherein the criterion is used to select which of the at least two authentication databases the first credential is to be authenticated against based on attributes of the network access controller through which the first connecting device is requesting access to the plurality of computer networks.

5. The first computer system of claim 1 wherein the criterion is used to select which of the at least two authentication databases the first credential is to be authenticated against based on attributes of the first connecting device.

6. The first computer system of claim 5 wherein the attributes of the first connecting device include the first connecting device's realm.

7. The first computer system of claim 1 further configured to receive at least a portion of authentication routing data from a third computer system residing on a computer network different than the first computer network.

8. The first computer system of claim 1 further configured to:
    store an authorization policy comprising one or more rules for controlling a connecting device's access to the plurality of computer networks;
    receive first authorization information related to the first connecting device;
    compare the first authorization information to the authorization policy; and
    control the first connecting device's access to the plurality of computer networks based on a result of the comparison.

9. The first computer system of claim 8 further configured to receive at least a portion of the first authorization information from the first authentication database.

10. The first computer system of claim 8 further configured to receive at least a portion of the authorization policy from a third computer system residing on a computer network different than the first computer network.

11. The first computer system of claim 8 wherein the authorization policy includes a rule for controlling access to the plurality of computer networks based on at least one of a group comprising attributes of a network access controller through which a connecting device requests access to the plurality of computer networks, a time of day at which the connecting device requests access to the plurality of computer networks, and attributes of one or more groups of which a user of a connecting device is a member; and wherein the first authorization information includes at least one of a group comprising attributes of the network access controller through which the first connecting device is requesting access to the plurality of computer networks, the time of day at which the first connecting device is requesting access to the plurality of computer networks, and attributes of one or more groups of which a first user of the first connecting device is a member.

12. The first computer system of claim 8 wherein controlling the first connecting device's access to the plurality of computer networks includes instructing the network access controller to permit the first connecting device access to a first network resource residing on the plurality of computer networks and deny the first connecting device access to a second network resource residing on the plurality of computer networks.

13. The first computer system of claim 1 further comprising an accounting computer system configured to:
- monitor the first connecting device's use of the plurality of computer networks;
- store one or more records of events involving the first connecting device's use of the plurality of computer networks; and
- transmit at least one of the one or more records to a third computer system residing on a computer network different from the first computer network.

14. The first computer system of claim 1 further configured to receive network service parameters allocating at least one logical address for a first type of network resource from a fourth computer system residing on a computer network different from the first computer network, store the network service parameters, and to provide a first network resource of the first type, executing on a third computer system residing on the first computer network, with an address containing the logical address.

15. The first computer system of claim 1 further configured to:
- receive, from a computer system residing on a computer network different than the first computer network, at least a portion of an authorization policy comprising one or more rules for controlling the first connecting device's access to the plurality of computer networks;
- store the authorization policy including the at least the portion of the authorization policy;
- receive first authorization information related to the first connecting device requesting access to the plurality of computer networks at the network access controller residing on the first computer network;
- compare the first authorization information to the authorization policy; and
- control the first connecting device's access to the plurality of computer networks based at least in part on a result of the comparison.

16. The first computer system of claim 15 wherein the authorization policy includes a rule for controlling access to the plurality of computer networks based on attributes of the network access controller through which a connecting device requests access to the plurality of computer networks, and the first authorization information includes attributes of the network access controller through which the first connecting device is requesting access to the plurality of computer networks.

17. The first computer system of claim 15 wherein the authorization policy includes a rule for controlling access to the plurality of computer networks based on a time of day at which the first connecting device requests access to the plurality of computer networks, and the authorization information includes the time of day at which the first connecting device is requesting the access to the plurality of computer networks.

18. The first computer system of claim 15 wherein the authorization policy includes a rule for controlling access to the plurality of computer networks based on attributes of one or more groups of which a first user of the first connecting device is a member, and the first authorization information includes the attributes of the one or more groups of which the first user of the first connecting device is a member.

19. The first computer system of claim 15 wherein controlling the first connecting device's access to the plurality of computer networks includes instructing the network access controller to permit the first connecting device access to a first network resource residing on the plurality of computer networks and deny the first connecting device access to a second network resource residing on the plurality of computer networks.

20. A non-transitory storage medium, readable by a first processor of a first computer system residing on a first computer network of a plurality of computer networks, having embodied therein a program of commands executable by the first processor, the program being adapted to be executed to:
- receive a first credential from a network access device on the first computer network, the first credential being relatable to a first connecting device requesting access to the plurality of computer networks at the network access device;
- select, using a criterion, at least one authentication routing policy from a plurality of authentication routing policies, each authentication routing policy of the plurality of authentication routing policies comprising:
  - address information associated with at least two authentication databases against which the first credential related to the first connecting device may be authenticated, wherein at least one of the at least two authentication databases is contained on a second computer system residing on a second computer network; and
- select a first authentication database of the at least two authentication databases of the at least one authentication routing policy against which the first credential is to be authenticated;
- communicate the first credential to the first authentication database using the address information;
- receive an authentication response from the first authentication database;
- communicate the authentication response to the network access device;
- receive at least a portion of an authorization policy comprising one or more rules for controlling a connecting device's access to the plurality of computer networks from a third computer system residing on a computer network different than the first computer network;
- store the authorization policy;
- receive first authorization information related to the first connecting device;
- compare the first authorization information to the authorization policy; and
- control the first connecting device's access to the plurality of computer networks based on a result of the comparison.

* * * * *